US012659234B2

(12) United States Patent
Zahavi

(10) Patent No.: US 12,659,234 B2
(45) Date of Patent: Jun. 16, 2026

(54) EVALUATING THE AVAILABLE BANDWIDTH BETWEEN LEAF SWITCHES IN A FAT-TREE NETWORK

(71) Applicant: MELLANOX TECHNOLOGIES, LTD., Yokneam (IL)

(72) Inventor: Eitan Zahavi, Zichron Yaakov (IL)

(73) Assignee: Mellanox Technologies, Ltd, Yokneam (IL)

( * ) Notice: Subject to any disclaimer, the term of this patent is extended or adjusted under 35 U.S.C. 154(b) by 316 days.

(21) Appl. No.: 18/508,287

(22) Filed: Nov. 14, 2023

(65) Prior Publication Data

US 2025/0158890 A1     May 15, 2025

(51) Int. Cl.
H04L 41/0896 (2022.01)
H04L 41/0677 (2022.01)

(52) U.S. Cl.
CPC ...... H04L 41/0896 (2013.01); H04L 41/0677 (2013.01)

(58) Field of Classification Search
CPC . H04L 41/0896; H04L 41/0677; H04L 41/12; H04L 43/0894; H04L 12/44; H04L 43/50; H04L 45/48; H04L 45/484; H04L 45/488; H04L 45/02; H04L 45/125; H04L 45/126
See application file for complete search history.

(56) References Cited

U.S. PATENT DOCUMENTS

| | | |
|---|---|---|
| 2014/0023084 A1 | 1/2014 | Goldenberg et al. |
| 2014/0258479 A1* | 9/2014 | Tenginakai ......... H04L 41/0889 709/220 |
| 2014/0341225 A1 | 11/2014 | Subramanian et al. |
| 2015/0124826 A1* | 5/2015 | Edsall ..................... H04L 45/66 370/392 |

(Continued)

FOREIGN PATENT DOCUMENTS

WO     WO-2025077388 A1 *     4/2025     ........... H04L 67/148

OTHER PUBLICATIONS

Definition of "contradictory" (accessed Nov. 13, 2025) (Year: 2025).*

(Continued)

*Primary Examiner* — Andrew W Chriss
(74) *Attorney, Agent, or Firm* — Meitar Patents Ltd.; Daniel Kligler

(57) ABSTRACT

A system for bandwidth estimation includes an interface and a processor. The interface communicates with a fat-tree (FT) network including leaf switches belonging to a bottom level, spine switches belonging to a top level and intermediate switches belonging to one or more intermediate levels. The processor estimates an available bandwidth between first and second leaf switches, by identifying a first bottom-to-top sub-tree to which the first leaf switch belongs, and a second bottom-to-top sub-tree to which the second leaf switch belongs, determining path counts for at least some of the switches in the intermediate levels, wherein a path count for (Continued)

a switch is indicative of a number of paths that each passes via the switch, reaches the first leaf switch via the first bottom-to-top sub-tree, and reaches the second leaf switch via the second bottom-to-top sub-tree, and estimating the available bandwidth based on the path counts.

20 Claims, 9 Drawing Sheets

(56)                 References Cited

U.S. PATENT DOCUMENTS

| | | | |
|---|---|---|---|
| 2015/0365325 A1 | 12/2015 | Hwang et al. | |
| 2016/0099834 A1 * | 4/2016 | Kim | H04L 49/15 |
| | | | 370/256 |
| 2017/0026461 A1 * | 1/2017 | Boutros | H04L 45/125 |
| 2020/0304406 A1 * | 9/2020 | Thubert | H04L 45/484 |
| 2020/0396175 A1 * | 12/2020 | Heidelberger | H04L 49/25 |
| 2021/0152494 A1 * | 5/2021 | Johnsen | H04L 47/805 |
| 2021/0288921 A1 | 9/2021 | Levy et al. | |
| 2022/0004865 A1 * | 1/2022 | Sawal | G06N 3/04 |
| 2023/0179471 A1 | 6/2023 | Thubert et al. | |
| 2023/0353507 A1 | 11/2023 | Zahid et al. | |
| 2024/0235984 A1 * | 7/2024 | Chunduri | H04L 45/302 |

OTHER PUBLICATIONS

Biswas et al, An Improved Congestion Free Modified Fat Tree Network-On-Chip Topology, International conference on Signal Processing, Communication, Power and Embedded System (SCOPES) (Year: 2016).*
Weatherspoon, Data Center Network Topologies: FatTree (Year: 2014).*
Prisacari et al "Bandwidth-optimal All-to-all Exchanges in Fat Tree Networks", ACM ICS '13 (Year: 2013).*
Ohring et al., "On Generalized Fat Trees," Proceedings of the 9th International Parallel Processing Symposium, IEEE, pp. 37-44, Apr. 1995.
Zahavi et al., "Quasi Fat Trees for HPC Clouds and Their Fault-Resilient Closed-Form Routing," Proceedings of the IEEE 22nd Annual Symposium on High-Performance Interconnects, pp. 1-9, Aug. 2014.
Leiserson, "Fat-Trees: Universal Networks for Hardware-Efficient Supercomputing," IEEE Transactions on Computers, vol. C-34, No. 10, pp. 892-901, Oct. 1985.
Dally et al., "Principles and Practices of Interconnection Networks," Morgan Kaufmann Publishers, Elsevier, Inc., pp. 1-581, year 2004.
Duato et al., "Interconnection Networks: An Engineering Approach," Morgan Kaufmann Publishers, Elsevier Science (USA), pp. 1-625, year 2003.
Wikipedia, "Dinic's algorithm," pp. 1-4, last edited Jul. 19, 2023.
Dinic, "Algorithm for Solution of a Problem of Maximum Flow in a Network with Power Estimation," Doklady Akademii Nauk, SSSR, vol. 11, No. 5, pp. 1277-1280, year 1970.
Zahavi, U.S. Appl. No. 18/458,191, filed Aug. 30, 2023.
U.S. Appl. No. 18/458,191 Office Action dated Mar. 14, 2024.

* cited by examiner

|     | 100 | 101 | 102 | 103 | 110 | 111 | 112 | 113 | 120 | 121 | 122 | 123 | 130 | 131 | 132 | 133 |
|-----|-----|-----|-----|-----|-----|-----|-----|-----|-----|-----|-----|-----|-----|-----|-----|-----|
| 100 |     | 3   | 3   | 3   | 3   | 3   | 3   | 3   | 2 | 3 | 3   | 3   | 3   | 3   | 3   | 3   |
| 101 | 3   |     | 4   | 4   | 3   | 4   | 4   | 4   | 3   | 4   | 4   | 4   | 4   | 4   | 4   | 4   |
| 102 | 3   | 4   |     | 4   | 3   | 4   | 4   | 4   | 3   | 4   | 4   | 4   | 4   | 4   | 4   | 4   |
| 103 | 3   | 4   | 4   |     | 3   | 4   | 4   | 4   | 3   | 4   | 4   | 4   | 4   | 4   | 4   | 4   |
| 110 | 3   | 3   | 3   | 3   |     | 3   | 3   | 3   | 2 | 3 | 3   | 3   | 3   | 3   | 3   | 3   |
| 111 | 3   | 4   | 4   | 4   | 3   |     | 4   | 4   | 3   | 4   | 4   | 4   | 4   | 4   | 4   | 4   |
| 112 | 3   | 4   | 4   | 4   | 3   | 4   |     | 4   | 3   | 4   | 4   | 4   | 4   | 4   | 4   | 4   |
| 113 | 3   | 4   | 4   | 4   | 3   | 4   | 4   |     | 3   | 4   | 4   | 4   | 4   | 4   | 4   | 4   |
| 120 | 2 | 3 | 3   | 3   | 2 | 3 | 3   | 3   |     | 3   | 3   | 3   | 3   | 3   | 3   | 3   |
| 121 | 3   | 4   | 4   | 4   | 3   | 4   | 4   | 4   | 3   |     | 4   | 4   | 4   | 4   | 4   | 4   |
| 122 | 3   | 4   | 4   | 4   | 3   | 4   | 4   | 4   | 3   | 4   |     | 4   | 4   | 4   | 4   | 4   |
| 123 | 3   | 4   | 4   | 4   | 3   | 4   | 4   | 4   | 3   | 4   | 4   |     | 4   | 4   | 4   | 4   |
| 130 | 3   | 4   | 4   | 4   | 3   | 4   | 4   | 4   | 3   | 4   | 4   | 4   |     | 4   | 4   | 4   |
| 131 | 3   | 4   | 4   | 4   | 3   | 4   | 4   | 4   | 3   | 4   | 4   | 4   | 4   |     | 4   | 4   |
| 132 | 3   | 4   | 4   | 4   | 3   | 4   | 4   | 4   | 3   | 4   | 4   | 4   | 4   | 4   |     | 4   |
| 133 | 3   | 4   | 4   | 4   | 3   | 4   | 4   | 4   | 3   | 4   | 4   | 4   | 4   | 4   | 4   |     |

Collect path from a selected top switch to each leaf switch ~90

For each leaf parent p, set color per level: dn-up-color[p][level] ~94

For each leaf s up port, get parent p and count: c=dn-up-color[p][level] count[s][level][c]++ ~98

For each leaf pair t1, t2
j=lowestCommLvl(t1,t2)
color_set = join(t1.count[j].keys, t2.count[j].keys)
BW = sum(c in color_set, min(t1.count[j][c], t1.count[j][c])) ~102 max-flows (leaf t1, leaf t2)

|c = h - |parents[t1] & parents[t2]| + 1

$T_1$ = T[t1][|c]; $T_2$ = T[t2][|c]; F=0 for color c in keys of $T_1$ U $T_2$ next c

F+=min($T_1$[c], $T_2$[c])

Return F

T[s][l][i] = leaf s n ports per level l and dn_up color next p

For each p in s parents n = number ports connecting s to p for level l next l c = Cols[p][l]

T[s][l][c] += n

EVALUATING THE AVAILABLE BANDWIDTH BETWEEN LEAF SWITCHES IN A FAT-TREE NETWORK

FIELD OF THE INVENTION

The present invention relates generally to data communication networks, and particularly to methods and systems for evaluation of available bandwidth in Fat-Tree (FT) networks.

BACKGROUND OF THE INVENTION

Fat-Tree (FT) is a network topology that is widely used in data centers and other data communication networks. The FT topology was first described by Leiserson in "Fat-Trees: Universal Networks for Hardware-Efficient Supercomputing," IEEE Transactions on Computers, Volume C-34, Issue 10, October 1985.

A generalized form of the FT topology is described by Ohring et al., in "On Generalized Fat Trees," Proceedings of the $9^{th}$ International Parallel Processing Symposium, Santa Barbara, California, April 1995. Another class of FT topologies, referred to as Quasi Fat Tree (QFT), is described by Zahavi et al., in "Quasi Fat Trees for HPC Clouds and Their Fault-Resilient Closed-Form Routing," Proceedings of the IEEE $22^{nd}$ Annual Symposium on High-Performance Interconnects," Mountain View, California, August, 2014.

SUMMARY OF THE INVENTION

An embodiment of the present invention that is described herein provides a system for bandwidth estimation including an interface and a processor. The interface is to communicate with a fat-tree (FT) network including a plurality of switches. The switches include (i) multiple leaf switches belonging to a bottom level, (ii) multiple spine switches belonging to a top level and (iii) multiple intermediate switches belonging to one or more intermediate levels between the top level and the bottom level. Multiple links connect between selected ones of the switches. The processor is to receive via the interface, from the FT network, topology information indicative of a current topology of the FT network, and, based on the topology information, estimate an available bandwidth between first and second leaf switches. The processor is to estimate the available bandwidth by identifying, from among a plurality of bottom-to-top sub-trees of the FT network each extending from a leaf switch to the top level, a first bottom-to-top sub-tree to which the first leaf switch belongs, and a second bottom-to-top sub-tree to which the second leaf switch belongs, determining path counts for at least some of the switches in the intermediate levels, wherein a path count for a switch is indicative of a number of paths that each (i) passes via the switch, (ii) reaches the first leaf switch via the first bottom-to-top sub-tree and (iii) reaches the second leaf switch via the second bottom-to-top sub-tree, and estimating the available bandwidth between the first and second leaf switches based on the path counts.

In some embodiments, the processor is to identify a lowest common level, defined as a lowest intermediate level of the FT network that includes a joint parent switch of the first and second leaf switches, and to determine the path counts for the switches in the lowest common level.

In a disclosed embodiment, the processor is to: assign indices to the switches in the FT network by scanning the leaf switches in sequence and, for each leaf switch in the sequence, traverse the bottom-to-top sub-tree to which the leaf switch belongs from the leaf switch toward the top level, and assign an index to each traversed switch that is not yet assigned any index, the index being unique to the leaf switch at least within the level to which the switch belongs; to define (i) a first set including the indices assigned to parents of the first leaf switch in the lowest common level, and (ii) a second set including the indices assigned to parents of the second leaf switch in the lowest common level; and, for each switch in the lowest common level, to determine the path count based on an intersection between the first set of indices and the second set of indices.

In an example embodiment, after completing the sequence, the processor is to identify a switch that in not assigned any index or that is assigned a contradictory index, and to assign the identified switch a consolidated index that is non-contradictory.

In an embodiment, the processor is to determine a total path count between the first leaf switch and the second leaf switch, by: identifying a set of switches in a given level that are common parents of the first leaf switch and the second leaf switch; for each common parent in the set, finding a minimum value between (i) a first number of ports connecting the common parent to the first leaf switch and (ii) a second number of ports connecting the common parent to the second leaf switch; and summing the minimal values over the set of the common parents.

In some embodiments, the topology information is indicative of failures in one or more of the links. In an example embodiment, in estimating the available bandwidth, the processor is to account only for failures occurring in links connecting the leaf switches to an intermediate level that is immediately above the bottom level.

There is additionally provided, in accordance with an embodiment that is described herein, a method for bandwidth estimation. The method includes receiving topology information indicative of a current topology of a fat-tree (FT) network, the FT network including a plurality of switches including (i) multiple leaf switches belonging to a bottom level, (ii) multiple spine switches belonging to a top level and (iii) multiple intermediate switches belonging to one or more intermediate levels between the top level and the bottom level, and multiple links connecting between selected ones of the switches. Based on the topology information, an available bandwidth between first and second leaf switches is estimated, by: from among a plurality of bottom-to-top sub-trees of the FT network each extending from a leaf switch to the top level, identifying a first bottom-to-top sub-tree to which the first leaf switch belongs, and a second bottom-to-top sub-tree to which the second leaf switch belongs; determining path counts for at least some of the switches in the intermediate levels, wherein a path count for a switch is indicative of a number of paths that each (i) passes via the switch, (ii) reaches the first leaf switch via the first bottom-to-top sub-tree and (iii) reaches the second leaf switch via the second bottom-to-top sub-tree; and estimating the available bandwidth between the first and second leaf switches based on the path counts.

There is further provided, in accordance with an embodiment that is described herein, a computer software product, the product including a tangible non-transitory computer-readable medium in which program instructions are stored. The instructions, when read by a processor, cause the processor to: receive topology information indicative of a current topology of a fat-tree (FT) network, the FT network including a plurality of switches including (i) multiple leaf switches belonging to a bottom level, (ii) multiple spine switches belonging to a top level and (iii) multiple interme-
diate switches belonging to one or more intermediate levels
between the top level and the bottom level, and multiple
links connecting between selected ones of the switches; and
based on the topology information, estimate an available
bandwidth between first and second leaf switches, by: from
among a plurality of bottom-to-top sub-trees of the FT
network each extending from a leaf switch to the top level,
identifying a first bottom-to-top sub-tree to which the first
leaf switch belongs, and a second bottom-to-top sub-tree to
which the second leaf switch belongs; determining path
counts for at least some of the switches in the intermediate
levels, wherein a path count for a switch is indicative of a
number of paths that each (i) passes via the switch, (ii)
reaches the first leaf switch via the first bottom-to-top
sub-tree and (iii) reaches the second leaf switch via the
second bottom-to-top sub-tree; and estimating the available
bandwidth between the first and second leaf switches based
on the path counts.

The present invention will be more fully understood from
the following detailed description of the embodiments
thereof, taken together with the drawings in which:

DETAILED DESCRIPTION OF EMBODIMENTS

Overview

Figure 1:
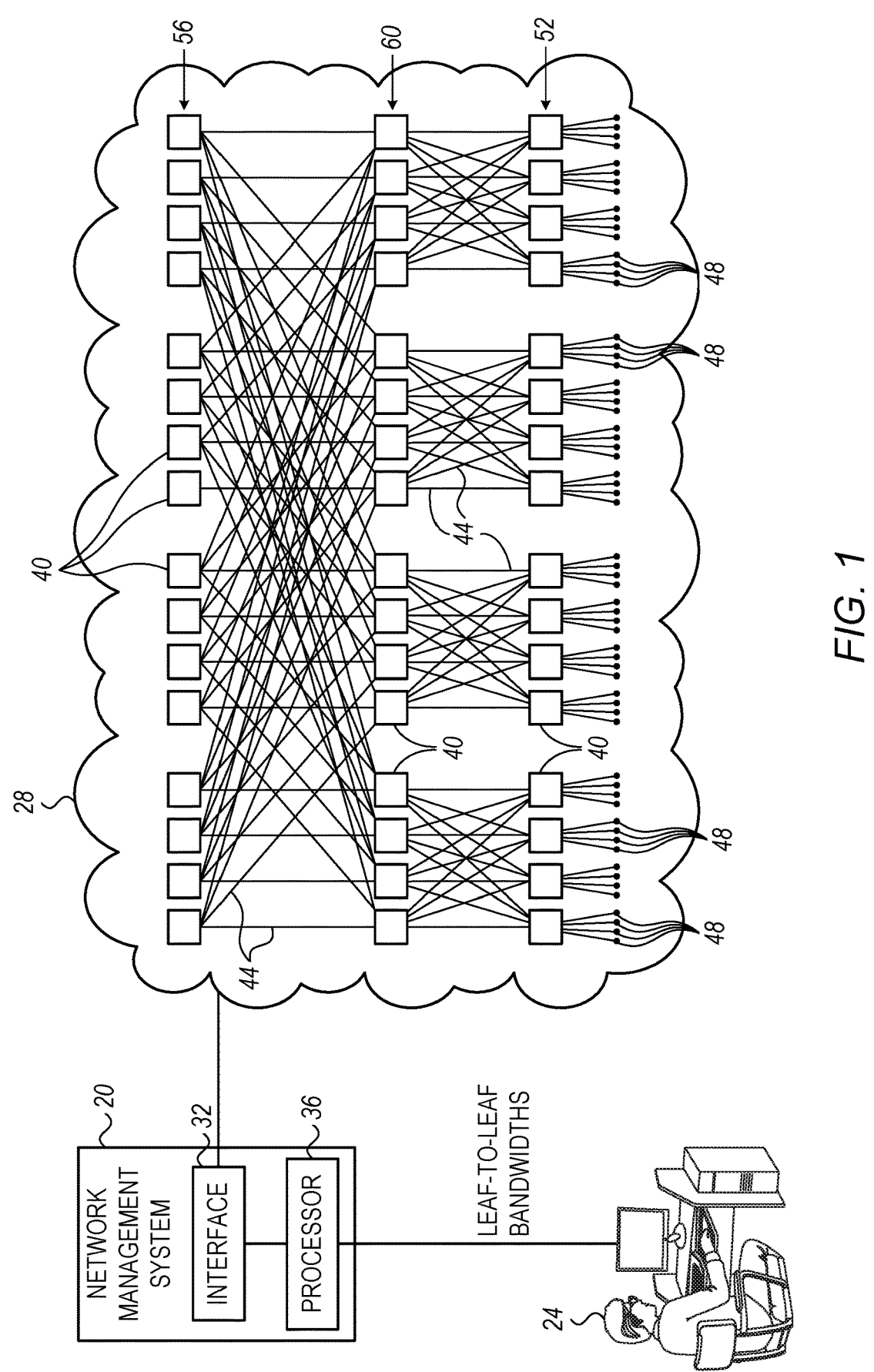
FIG. 1 is a block diagram that schematically illustrates a
Network Management System (NMS) that manages a Fat-
Tree (FT) network, in accordance with an embodiment of the
present invention.

A Fat-Tree (FT) network comprises multiple switches and
multiple communication links that connect the switches to
one another. The switches are arranged in levels, including
a leaf level (also referred to as a bottom level), a spine level
(also referred to as a top level), and optionally one or more intermediate levels. The switches of the leaf level, spine
level and intermediate levels are referred to herein as leaf
switches, spine switches and intermediate switches, respec-
tively. Hosts served by the FT network are typically con-
nected to the switches of the leaf level.

Various flavors of the classic FT topology have been
formulated and used, including the generalized FT and
Quasi-FT topologies, cited above. In the context of the
present disclosure and in the claims, the term "FT network"
refers broadly to classic FT and to any variant thereof. A FT
network can be viewed as comprising a plurality of "bottom-
to-top sub-trees". Each bottom-to-top sub-tree extends from
a respective leaf switch toward the spine level.

Links in a FT network may become faulty over the
network's lifetime. In the present context, the term "faulty
link" refers to a link that is unable to transfer data at the
link's specified bandwidth and quality. A link may fail for
various reasons, e.g., due to a defective cable or switch port.
The embodiments described herein refer mainly to complete
failures, i.e., to faults that reduce the link bandwidth to zero.
The disclosed techniques, however, can also be used with
faults that degrade the link performance but still retain some
available bandwidth.

It is important to note that the mere number of faulty links
does not fully describe the actual impact of the faulty links
on the network's performance. In other words, a certain
number of faulty links have a tolerable effect or a severe
effect on the network, depending on where the failures occur
in the network topology. Understanding the impact of the
faulty links on the main figures of merit of the network
enables improved network management. For example,
maintenance operations, e.g., replacements of faulty links,
can be prioritized correctly. As another example, processing
tasks can be assigned to hosts while considering the actual
impact of the faulty links. As yet another example, alerts
triggered by faulty links can be filtered and/or assigned
different severities depending on the actual severity of the
faults.

Embodiments that are described herein provide methods
and systems for assessing the actual impact of faulty links on
the performance of a FT network. More specifically, the
disclosed techniques assess the maximum available band-
widths between pairs of leaf switches.

Knowledge of the available bandwidths between pairs of
leaf switches (referred to herein as "leaf-to-leaf band-
widths") is of considerable value for "job placement", for
processing i.e., assigning tasks to hosts. By considering the
available leaf-to-leaf bandwidths, tasks that are closely
related (and therefore communicate extensively with one
another) can be assigned to hosts served by leaf switches
having a large available bandwidth between them. By the
same token, tasks that are independent of one another can be
assigned to hosts served by leaf switches having smaller
leaf-to-leaf bandwidths.

The disclosed techniques are typically carried out by a
Network Management System (NMS) that is coupled to the
FT network. In some embodiments, the NMS comprises an
interface for communicating with the switches of the FT
network, and a processor that carries out the methods
described herein. The processor receives from the switches
topology information indicative of which links are func-
tional (operational) and which links are faulty. Based on the
topology information, the processor estimates the maximum
available bandwidth per pair of leaf switches. The processor
may estimate a respective maximum available bandwidth for
every possible pair of leaf switches, or only for selected
pairs.

In an example embodiment, the processor estimates the maximal available bandwidth between a pair of leaf switches (referred to as a $1^{st}$ leaf switch and a $2^{nd}$ leaf switch) by:

Identifying a $1^{st}$ bottom-to-top sub-tree to which the $1^{st}$ leaf switch belongs, and a $2^{nd}$ bottom-to-top sub-tree to which the $2^{nd}$ leaf switch belongs. The $1^{st}$ bottom-to-top sub-tree comprises all the parent switches of the $1^{st}$ leaf switch. Similarly, the $2^{nd}$ bottom-to-top sub-tree comprises all the parent switches of the $2^{nd}$ leaf switch. Identifying the two bottom-to-top sub-trees is thus equivalent to identifying the parent switches of each leaf switch.

Using the two bottom-to-top sub-trees, identifying the lowest common level of the two leaf switches. The lowest common level is defined as the lowest level of the FT network containing at least one switch that is a parent of both leaf switches.

Determining "path counts" over the switches of the lowest common level. A path count for a switch is indicative of the number of paths that each (i) passes via the switch, (ii) reaches the $1^{st}$ leaf switch via the $1^{st}$ bottom-to-top sub-tree and (iii) reaches the $2^{nd}$ leaf switch via the $2^{nd}$ bottom-to-top sub-tree. The path counts are typically counted with port (link) granularity, i.e., multiple links connected in parallel between two switches are counted as multiple paths.

Deriving the available bandwidth between the $1^{st}$ and $2^{nd}$ leaf switches from the path counts, e.g., in link-bandwidth units.

In practice, a major contributor to the computational complexity of the above scheme is the task of finding the common parent switches for each pair of leaf switches. In some embodiments described herein, the processor performs this task efficiently in a preparatory stage referred to as "coloring".

In a typical coloring process, the processor scans the FT network and assigns indices ("colors") to the various switches. Typically, the processor starts with a certain leaf switch, and scans the bottom-to-top sub-tree of the leaf switch level-by-level towards the spine level. In a given level, the processor assigns the parent switches of the leaf switch a unique index (also referred to herein as "color"). The index is unique within the level, not necessarily over the entire network.

After completing the index assignment up to and including the top (spine) level, the processor proceeds to the next leaf switch and repeats the process. If the processor encounters a switch that has already been assigned an index (because it belongs to the bottom-to-top sub-tree of another leaf switch that was already scanned), the switch is skipped. The process ends when the bottom-to-top sub-trees of all leaf switches have been scanned and "colored". In some embodiments, the processor may then carry out a consolidation process that assigns indices to any switches that have been missed and/or assigned contradictory indices due to faulty (missing) links.

The "coloring" process is performed for the FT network as a whole, not for any particular pair of leaf switches. The processor can then use the assigned indices to find the set of common parents of any desired pair of leaf switches (possibly, but not necessarily, all pairs of leaf switches). The processor then derives the leaf-to-leaf bandwidth of any desired pair of leaf switches, for example by summing the path counts, which connect the leaf switches, over the common parents in the lowest common level.

The leaf-to-leaf bandwidth calculation schemes disclosed herein are highly efficient, and are therefore particularly appealing for use in large FT networks. A comparison of computational complexity between the disclosed techniques and the fastest known "max-flow" algorithm (known as the "Dinic algorithm") is given below.

System Description

FIG. 1 is a block diagram that schematically illustrates a Network Management System (NMS) 20 used by an operator 24 to manage a Fat-Tree (FT) network 28, in accordance with an embodiment of the present invention. Network 28 may comprise, for example, a data center, a High-Performance Computing (HPC) cluster, or any other suitable type of network. Network 28 may operate in accordance with any suitable network protocol, e.g., Ethernet or InfiniBand™ (IB).

In the example of FIG. 1, NMS 20 comprises an interface 32 and a processor 36. Interface 32 communicates with network 28. Processor 36 carries out the various tasks of NMS 20. In particular, processor 36 estimates available bandwidths between pairs of switches in network 28 using techniques that are described herein.

Network 28 comprises multiple network switches 40 and multiple network links 44. Switches 40 may comprise, for example, layer-2 Ethernet or IB switches. Network links 44 may comprise, for example, electrical or optical cables. Each link 44 connects a port of one switch 40 to a port of another switch 40. A given pair of switches may be connected in parallel by more than a single link 44. Network 28 serves a plurality of hosts 48, e.g., servers or other computers.

In accordance with the FT topology, switches 40 of network 28 are arranged in multiple levels. The present example shows a three-level network comprising a leaf level 52 (also referred to as a bottom level), a spine level 56 (also referred to as a top level), and an intermediate level 60. Hosts 48 are connected to the switches in the leaf level. In alternative embodiments, network 28 may comprise multiple intermediate levels between the leaf level and the spine level.

The configurations of NMS 20 and network 28, as shown in FIG. 1, are example configurations that are chosen purely for the sake of conceptual clarity. In alternative embodiments, any other suitable configurations can be used. Elements that are not necessary for understanding the principles of the present invention have been omitted from the figures for clarity.

The various elements of NMS 20 and network 28 may be implemented in hardware, e.g., in one or more Application-Specific Integrated Circuits (ASICs) or FPGAs, in software, or using a combination of hardware and software elements. In some embodiments, processor 36 may be implemented, in part or in full, using one or more general-purpose processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Estimation of Maximum Available Bandwidth Between Leaf Switches

Figure 2A:
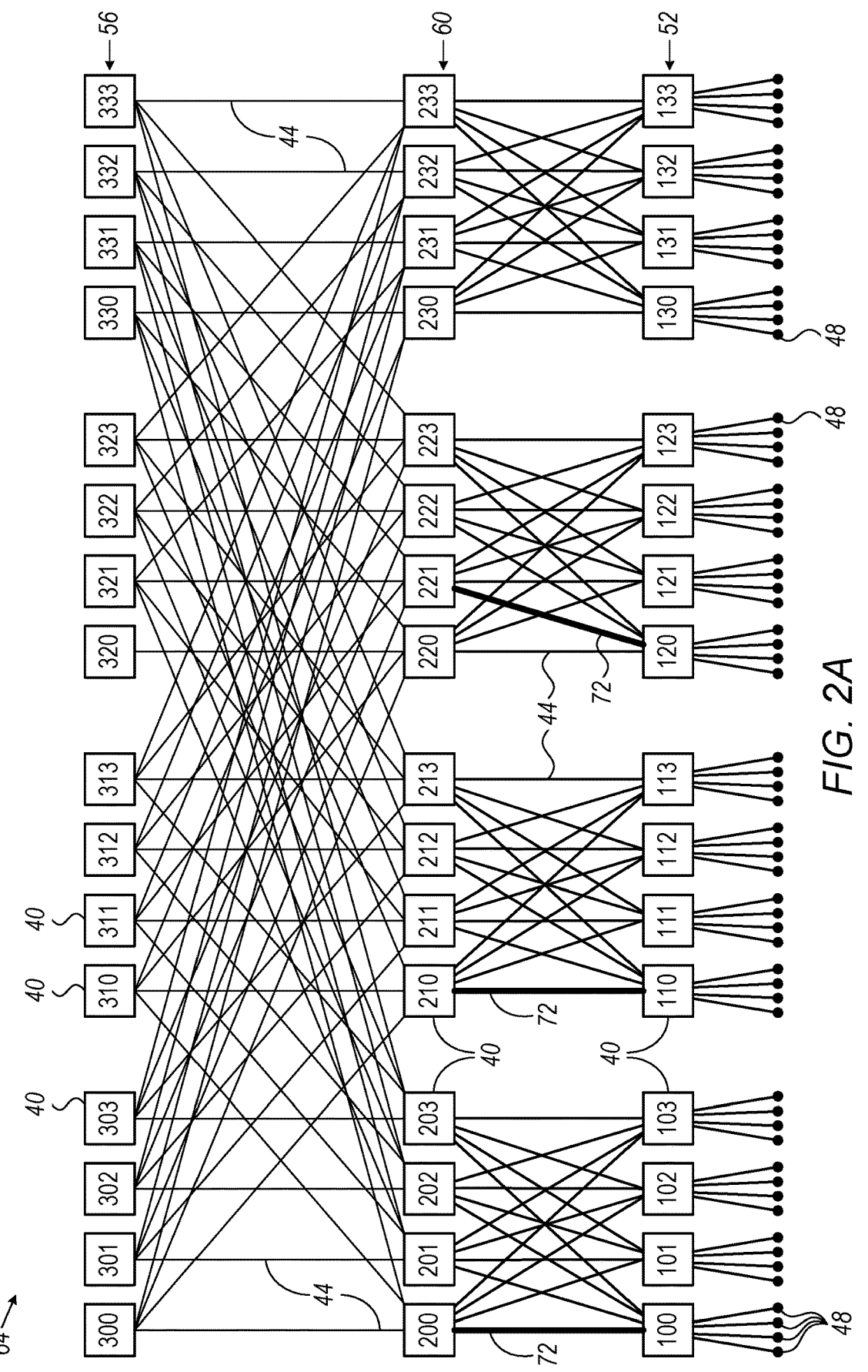
FIGS. 2A and 2B are diagrams that schematically illus-
trate a FT network with faulty links, in accordance with an
embodiment of the present invention.

FIG. 2A is a diagram that schematically illustrates a FT network 64, in accordance with an embodiment of the present invention. In the present example, network 64 comprises a total of forty-eight switches 40 arranged in three levels—Leaf level 52, spine level 56 and intermediate level 60. Each switch is numbered using a three-digit index in which:

The first digit denotes the level to which the switch belongs (1—leaf, 2—intermediate, 3—spine).

The second digit denotes a subset, within the level, to which the switch belongs (subset 0 through subset 3).

The third digit is an index of the individual switch within the subset (switch 0 through switch 3).

Any FT network, with network 64 of FIG. 2A being a non-limiting but demonstrative example, can be viewed as comprising multiple bottom-to-top sub-trees. Each bottom-to-top sub-tree begins (i.e., has its root) at one of the leaf switches and extends upwards via intermediate level 60 toward spine level 56. For example, bottom-to-top the sub-tree beginning at leaf switch "110" includes switches "210"-"213" in intermediate level 60, and all spine switches in spine level 56. Similarly, the bottom-to-top sub-tree beginning at leaf switch "123" includes switches "220"-"223" in intermediate level 60, and all spine switches in spine level 56. A path from one leaf switch ("source switch") to another leaf switch ("destination switch") first traverses upwards within the bottom-to-top sub-tree of the source switch, and then traverses downwards within the bottom-to-top sub-tree of the destination switch. Some paths reach spine level 56 (e.g., paths from switch "100" to switch "122"). Other paths (e.g., paths from switch "100" to switch "103") only reach intermediate level 60.

As can be seen in the example of FIG. 2A, FT networks possess considerable redundancy, in that a pair of hosts 48 can communicate over multiple alternative paths (each path traversing multiple links 44 and one or more switches 40). In addition to redundancy, the multiple alternative paths also increase the available bandwidth, since traffic can be distributed among them in parallel. Faulty links in the network reduce the level of redundancy and also reduce the available bandwidth over at least part of the network.

Over time, some of links 44 may fail. As noted above, the actual impact of faulty links on the network performance depends not only on their number, but also on the way they are distributed in the FT topology. For example, faulty links that are scattered evenly across the network will typically have a lesser effect than faulty links that are concentrated in a particular region. In the example of FIG. 2A, network 64 comprises three faulty links (marked in bold and numbered 72A-72C in the figure).

In some embodiments, processor 36 of NMS 20 receives, from network 28, topology information indicative of the current topology of the network (e.g., of which links 44 are operational and which links 44 are faulty). Based on the topology information, processor 36 estimates and reports the maximal available bandwidth between pairs of leaf switches (switches 40 in leaf level 52, which are denoted "1XX") using methods that are described in detail below.

Figure 2B:
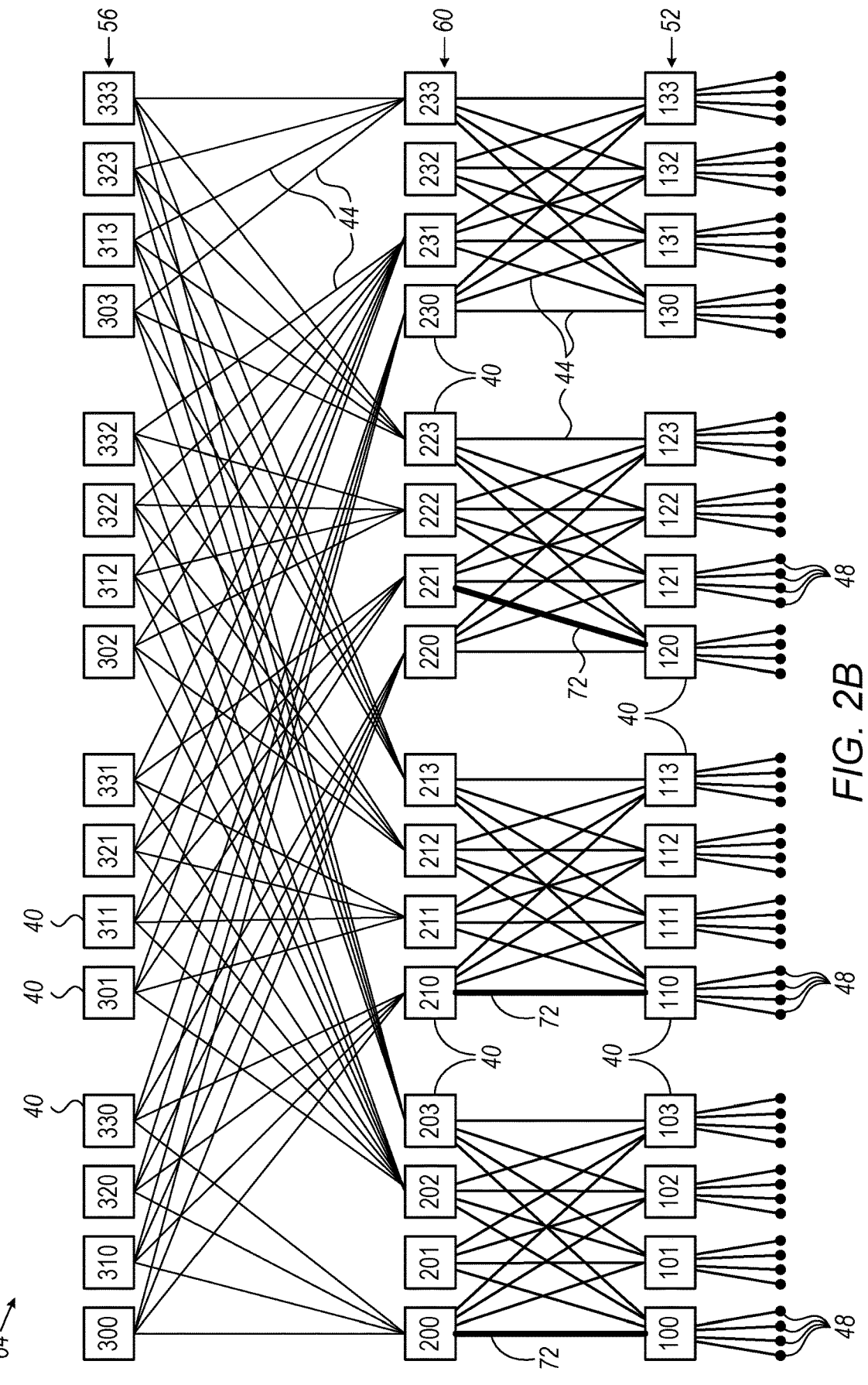

FIG. 2B is a diagram that schematically illustrates a different presentation of FT network 64 of FIG. 2A. The network topology of FIG. 2B is identical to the topology of FIG. 2A. The only difference between the two figures is the order in which the switches of spine level 56 (switches denoted "3XX") are drawn. The presentation of FIG. 2B visualizes more clearly which pairs of leaf switches are mostly impacted by the three faulty links 72A-72C.

As can be seen in FIG. 2B, faulty link 72A (between switches "100" and "200") and faulty link 72B (between switches "110" and "210") disconnect leaf switches "100" and 110" from the entire bipartite graph that connects switches "200" and "210" via spine level 56. Leaf switches "100" and "110" remain connected to one another via three other full bipartite graphs.

Leaf switch "120", on the other hand, is disconnected from an additional bipartite graph between levels 60 and 56. This is due to faulty link 72C. Consequently, leaf switches "100" and "120" remain connected to one another via only two bipartite graphs.

Figures 3, 4:
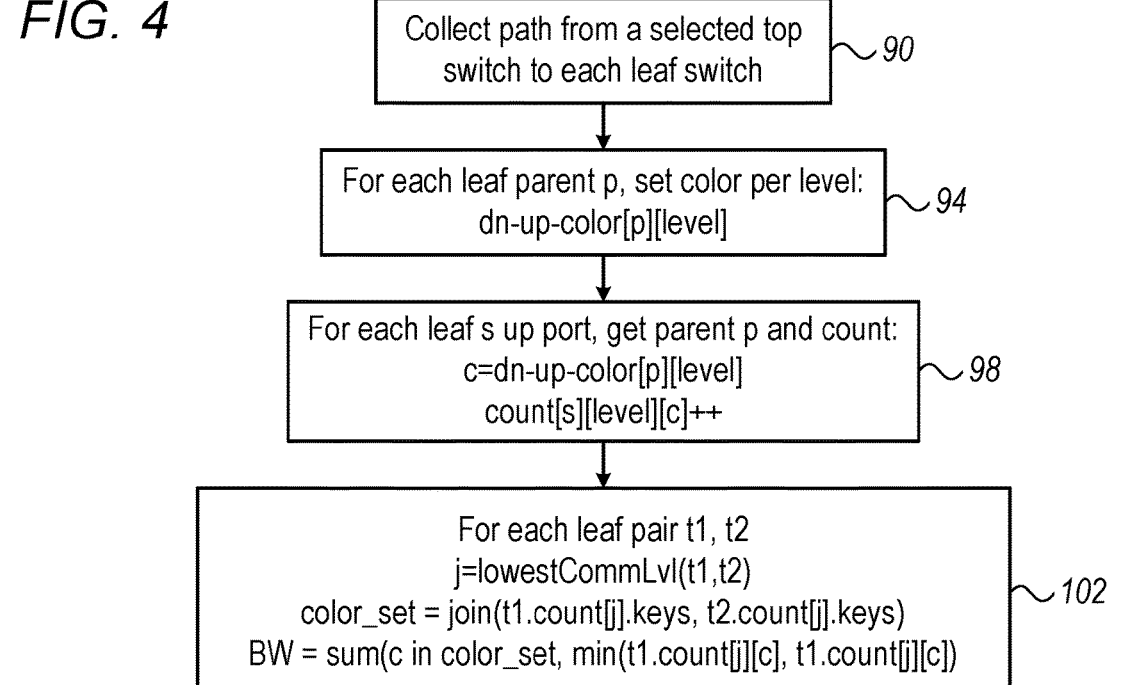
FIG. 3 is a table of maximal available bandwidths
between pairs of leaf switches in the FT network of FIGS.
2A and 2B, in accordance with an embodiment of the present
invention.
FIG. 4 is a flow chart that schematically illustrates a
method for estimating the maximal available bandwidth
between pairs of leaf switches using coloring, in accordance
with an embodiment of the present invention.

FIG. 3 is a table of maximal available bandwidths between pairs of leaf switches in FT network 64 of FIGS. 2A and 2B, in accordance with an embodiment of the present invention. The maximal available bandwidths are given in units of the full bandwidth of a single link 44, assuming by way of non-limiting example that links 44 are of equal bandwidths.

As seen, leaf switches that are not impacted by the faulty links are connected to one another by a total of four parallel links, and therefore have a maximum available bandwidth of 4. Some pairs of leaf switches (e.g., the pair "100" and "110" discussed above) have a maximum available bandwidth of 3. Other pairs of leaf switches (e.g., the pair "100" and "120" discussed above) have a maximum available bandwidth of only 2.

In various embodiments, processor 36 may use various methods for estimating the maximal available bandwidth between leaf switches in a FT network. The simplified description below outlines one possible solution at high level, for a given pair of leaf switches. A detailed flow of a highly-efficient method, which comprises (i) a preparatory stage that is performed in advance for all pairs of leaf switches, and (ii) an estimation stage that is performed separately for each pair of leaf switches, is described with respect to FIG. 4 further below.

For a given pair of leaf switches (referred to as a "$1^{st}$ leaf switch" and a "$2^{nd}$ leaf switch"), processor 36 identifies $1^{st}$ and $2^{nd}$ bottom-to-top sub-trees to which the $1^{st}$ and $2^{nd}$ leaf switches belong, respectively. Using the two bottom-to-top sub-trees (which are in effect respective sets of the parents of the two leaf switches), processor 36 identifies the lowest common level of the two leaf switches. As noted above, the lowest common level is the lowest level of the FT network containing at least one switch 40 that is a parent of both leaf switches.

Processor 36 then scans the switches in the lowest common level that are common parents of the two leaf switches. For each common parent, processor 36 determines a respective "path count". A path count for a switch is indicative of the number of paths that each (i) passes via the switch, (ii) reaches the $1^{st}$ leaf switch via the $1^{st}$ bottom-to-top sub-tree and (iii) reaches the $2^{nd}$ leaf switch via the $2^{nd}$ bottom-to-top sub-tree. Typically, processor 36 counts the path counts with port (link) granularity, so that multiple links connected in parallel between two switches are counted as multiple paths.

Subsequently, processor 36 derives the available bandwidth between the $1^{st}$ and $2^{nd}$ leaf switches from the path counts. The path count of a switch is equivalent to the maximal available bandwidth between the $1^{st}$ and $2^{nd}$ leaf switches via that switch. A sum of the path counts, over all the common parents of the two leaf switches in the lowest common level, is indicative of the overall maximal available bandwidth between the two leaf switches. In an embodiment, processor 36 calculates this sum and reports it as the maximal available bandwidth (in units of the bandwidth of an individual link 44).

In some embodiments, processor 36 reports the calculated leaf-to-leaf bandwidths (e.g., in the form of the table of FIG. 3 or in any other suitable form) to operator 24. Operator 24 may take any suitable action based on the calculated leafto-leaf bandwidths, for example, assign computing tasks to hosts 48 in a manner that best utilizes the available leaf-to-leaf bandwidths.

The method flow described above is a highly simplified flow that is depicted purely for the sake of conceptual clarity. In alternative embodiments, processor 36 may use any other suitable flow for calculating the maximal available bandwidth between a pair of leaf switches. For example, some of the calculations (e.g., identification of parent switches) can be performed jointly for all leaf switches in advance, in a computationally efficient manner. A process of this sort is described below.

Efficient Leaf-to-Leaf Bandwidth Estimation Using "Coloring"

The fastest known algorithm for finding the maximal flow between a pair of nodes in a graph is the well-known "Dinic algorithm". The Dinic algorithm was described, for example, by Dinic, in "Algorithm for Solution of a Problem of Maximum Flow in a Network with Power Estimation," Doklady Akademii Nauk, SSSR, 1970, volume 11, pages 1277-1280.

The Dinic algorithm has an asymptotic computational complexity of $O(V^2E)$, wherein E and V denote the number of edges and the number of vertices in the graph, respectively. Applying the Dinic algorithm to all pairs of leaf switches in FT network 28 has a complexity on the order of $O(V^4E^2)$, approximating the number of leaf switches by ~V. This computational complexity is prohibitive in large networks.

In some embodiments of the present invention, processor 36 reduces the computational complexity of leaf-to-leaf bandwidth estimation considerably, by using a highly efficient process of identifying the set of common parent switches of each pair of leaf switches. In these embodiments, processor 36 first performs a preparatory process, referred to herein as "coloring", which assigns indices ("colors") to the various switches of the FT network. The "coloring" process is performed for the FT network as a whole, not for any particular pair of leaf switches. Processor 36 then uses the assigned indices for finding the set of common parents of any desired pair of leaf switches, and derives the leaf-to-leaf bandwidth therefrom.

In comparison with the performance of the Dinic algorithm (whose complexity is on the order of $O(V^4E^2)$), the computational complexity of the disclosed coloring-based scheme is on the order of $O(\log(V)V^2)$.

FIG. 4 is a flow chart that schematically illustrates a method for estimating the maximal available bandwidth between pairs of leaf switches using coloring, in accordance with an embodiment of the present invention.

The method begins with processor 36 finding and storing, for each leaf switch, a list of the leaf switch's parent switches toward a single selected spine switch. For a given leaf switch, processor 36 typically finds the parent switches by progressing from the spine switch downwards toward the leaf switch. By subsequently comparing the lists of parents of two leaf switches, processor 36 can determine (i) the set of common parents of the two leaf switches and (ii) the lowest common level of the two leaf switches. Example pseudocode for collecting the lists of parents of the leaf switches is given in FIGS. 6 and 7 below.

Figure 5:
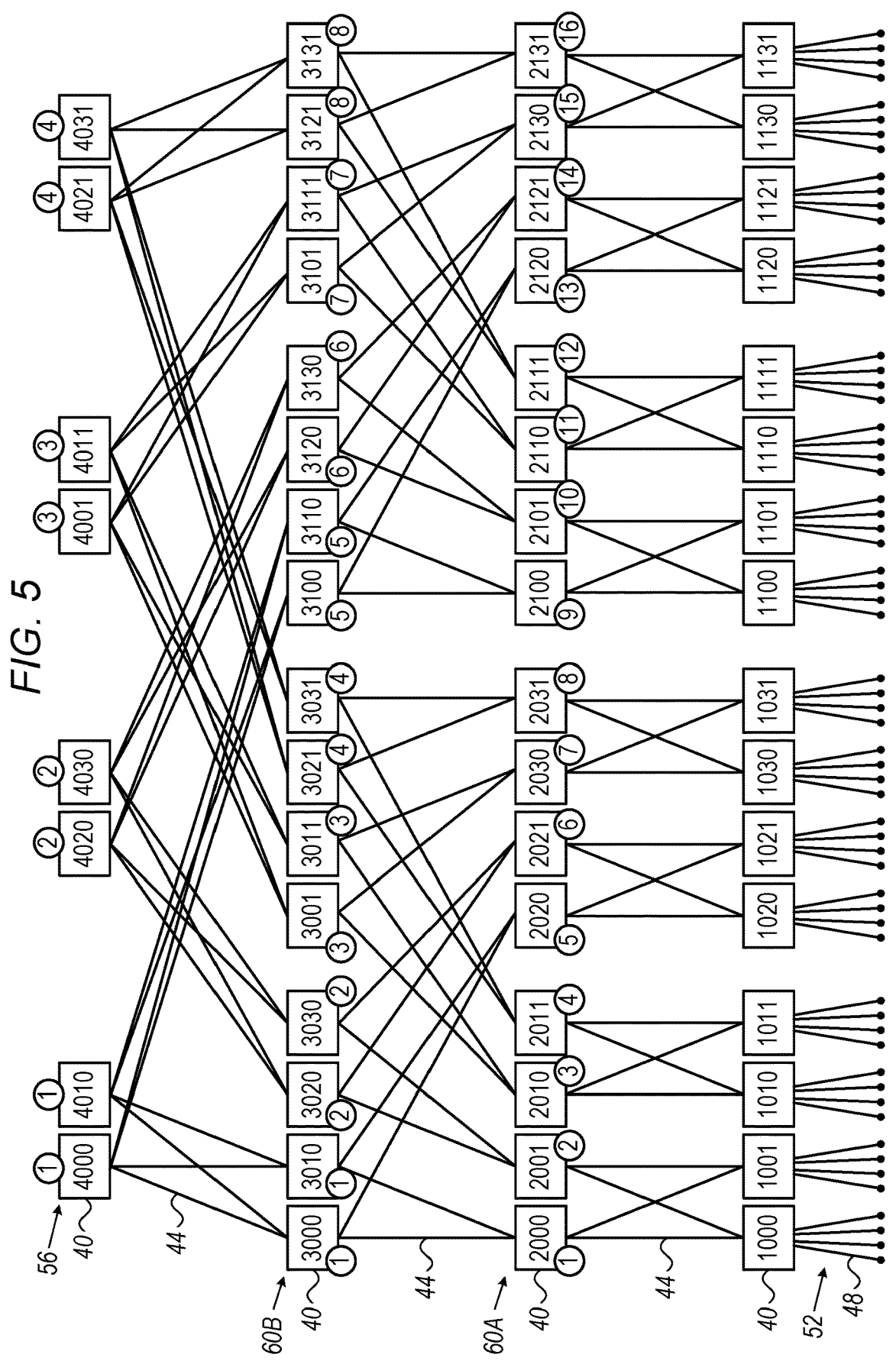
FIG. 5 is a diagram that schematically illustrates a process
of assigning indices to parent switches ("coloring"), in
accordance with an embodiment of the present invention.

At a coloring stage 94, processor 36 assigns indices to switches in FT network 28, from the level immediately above the leaf level (the lowest intermediate level) and upwards. A demonstrative example of this process is depicted in FIG. 5 below. The indices later assist in establishing the unique bottom-to-top sub-tree to which each leaf switch belongs. In an embodiment, processor 36 assigns the indices as follows:

1. Select a leaf switch.
2. Set the current level to be the lowest intermediate level (the level immediately above the leaf level).
3. Scan the parents of the leaf switch in the current level, and assign an index to any switch that is not yet assigned an index. The indices may comprise, for example, integer numbers. The assigned indices are unique at least within the current level. If a switch is already assigned an index, skip the switch.
4. After scanning the entire current level, increment the current level to be the next-higher level, and repeat step 3 above, until reaching the spine level (inclusive).
5. After completing steps 2-4 above for a given leaf switch, proceed to another leaf switch, until indices have been assigned to the parents of all leaf switches.

Example pseudocode for assigning indices is given in FIGS. 8-10 below. In some cases, one or more switches may remain unassigned and/or assigned contradictory indices, e.g., due to missing (faulty) links. In an embodiment, after completing steps 1-5 above, processor 36 carries out a consolidation process that resolves such missing and/or contradictory assignments. Example pseudocode for implementing the consolidation process is given in FIG. 11 below.

At a link counting stage 98, processor 36 sums for each leaf switch, for every parent level, the total number of links that connect the leaf switch to parent switches belonging to the same bottom-to-top sub-tree (recognized by their assigned index). Processor 36 performs this counting process for every parent level. Example pseudocode for performing stage 98 is given in FIG. 12 below.

Stages 90-98 of the method, described above, make-up the preparatory process. At a bandwidth calculation stage 102, processor 36 uses the information collected at the preparatory process to calculate the available bandwidths between pairs of leaf switches. For a given pair of leaf switches (denoted "1$^{st}$ leaf switch" and "2$^{nd}$ leaf switch") processor 36 performs the following:

1. Identify the lowest common level of the two leaf switches (by comparing the lists of parents of the two leaf switches, as collected at stage 90).
2. Select a common parent of the two leaf switches in the lowest common level.
3. Determine (i) the number of links via which the 1$^{st}$ leaf switch connects to the common parent switch, and (ii) the number of links via which the 2$^{nd}$ leaf switch connects to the common parent switch. Take the minimum of the two numbers of links. This minimum (also referred to as "path count") gives the maximal available bandwidth between the two leaf switches via the common parent switch being examined (in units of a single link's bandwidth). The path count can be determined from the intersection of the two sets of indices ("colors") of the two leaf switches.
4. Repeat steps 2-3 for all common parents of the two leaf switches in the lowest common level. Sum the maximal available bandwidths of the common parents (calculated at step 3) over all the common parents of the two leaf switches in the lowest common level. The sum gives the total available bandwidth between the pair of leaf switches.

Example pseudocode for finding the maximal available bandwidth between a pair of leaf switches is given in FIG. 13 below.

FIG. 5 is a diagram that demonstrates the index assignment ("coloring") process performed by processor 36 at stage 94 of FIG. 4, in accordance with an embodiment of the present invention. In the present example the network is a four level FT network comprising leaf level 52, two intermediate levels denoted 60A and 60B, and spine level 56. Each switch 40, from level 60A and above, is assigned a respective index ("color"). The indices are depicted in circles next to their respective switches.

As explained above, processor 36 starts assigning indices to the switches in the level immediately above the leaf level. In this level, processor 36 assigns each switch a different index. In the present example, the level immediately above the leaf level is level 60A, and the switches in this level are assigned indexes 1 through 16.

Then, processor 36 begins the assignment from the bottom-to-top sub-tree of switch "2000". This bottom-to-top sub-tree comprises switches "3000" and "3010" in level 60B, and switches "4000" and "4010" in level 56. Processor 36 assigns these switches an index "1", which is unique within the respective levels.

Next, processor 36 proceeds to the bottom-to-top sub-tree of switch "2001". This bottom-to-top sub-tree comprises switches "3020" and "3030" in level 60B, and switches "4020" and "4030" in level 56. These switches have not been assigned indices yet, and therefore processor 36 assigns them an index "2", which is unique within the respective levels.

Processor 36 repeats the process in a similar manner for the bottom-to-top sub-tree of switch "2010" (which results in assignment of the unique index "3" to switches "3000", "3011", "4001" and "4011"), and for the bottom-to-top sub-tree of switch "2011" (resulting in assignment of the unique index "4" to switches "3021", "3031", "4021" and "4031").

When processing the bottom-to-top sub-tree of switch "2020", processor 36 finds that all the switches in this sub-tree ("3000", "3010", "4000" and "4010") have already been assigned indices. Processor 36 therefore skips these switches. The same skipping, for the same reason, occurs when processing the bottom-to-top sub-trees of switches "2021", "2030" and "2031". None of the parents of these switches warrants assignment of a new index.

When processing the bottom-to-top sub-tree of switch "2100", processor 36 again encounters switches having no indices (switches "3100", "3110") and assigns them the unique index "5". In level 56, the bottom-to-top sub-tree of switch "2100" has only switches that already have indices.

The process continues in the same manner, until all the switches from level 60A and upwards are assigned the indices shown in the figure.

Example Pseudocode

FIGS. 6-13 provide example pseudocode for carrying out the various stages of the disclosed leaf-to-leaf bandwidth calculation process, in accordance with embodiments of the present invention. Code based on this pseudocode can be executed, for example, by processor 36 of NMS 20 of FIG. 1. The pseudocode is provided by way of non-limiting example; any other suitable code flow can be used in alternative embodiments.

Figure 6:
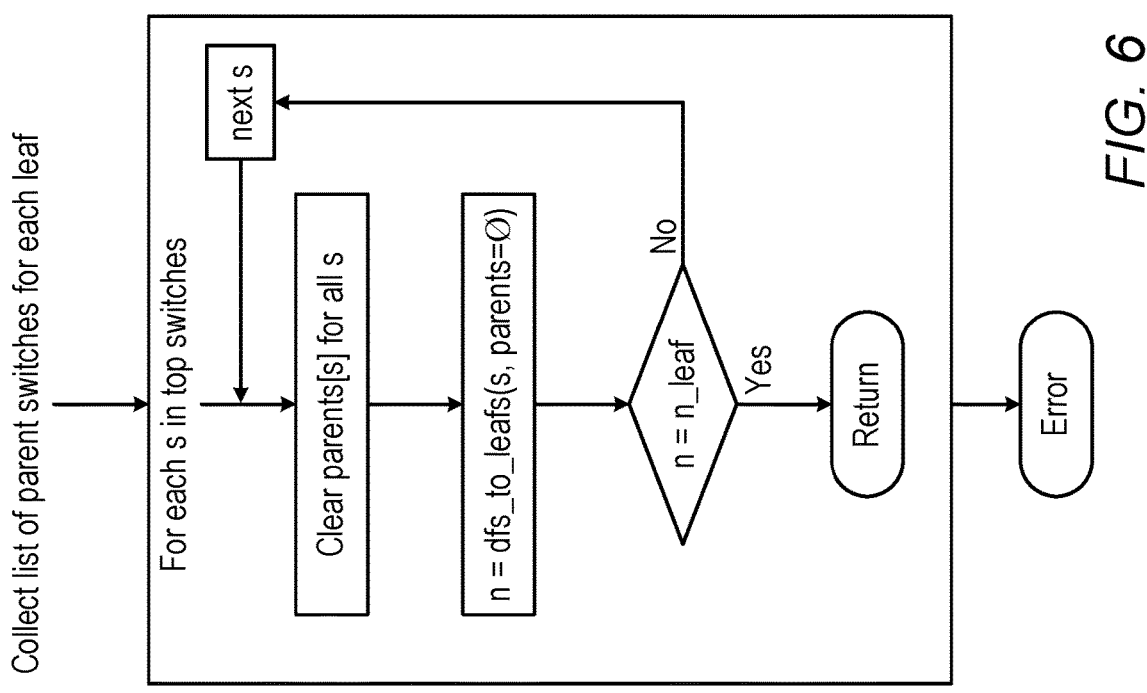

FIG. 6 shows example pseudocode for a routine that returns the parent switches of each leaf switch in a FT network, in accordance with an embodiment of the present invention. This task corresponds to stage 90 of FIG. 4.

Figure 7:
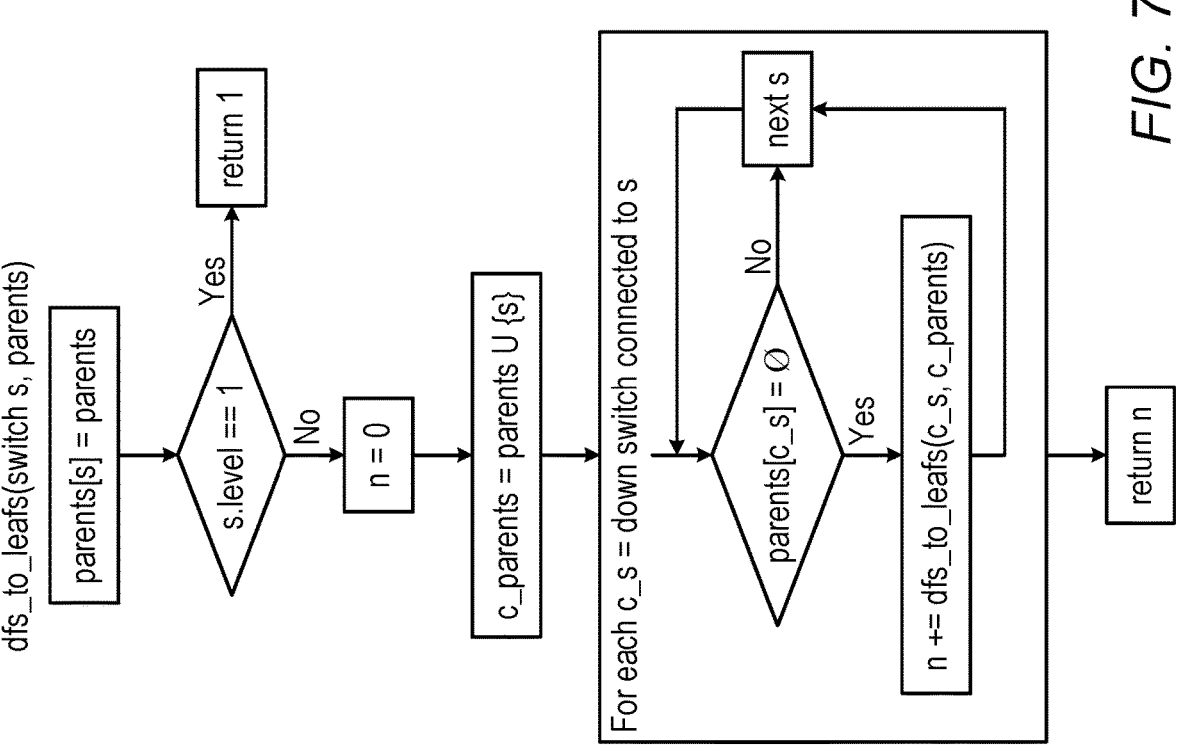
FIGS. 6 and 7 are diagrams showing example pseudocode
for identifying the parent switches of each leaf switch in a
FT network, in accordance with an embodiment of the
present invention.

FIG. 7 shows example pseudocode of a Depth-First Search (DFS) routine used in the pseudocode of FIG. 6. The DFS routine scans the FT network in a DFS order starting from a specified spine (top) switch.

FIGS. 8-11 are diagrams showing example pseudocode for assigning indices to switches ("coloring"), in accordance with an embodiment of the present invention.

The pseudocode initially collects pre-assigned indices (colors) from all the parents of each leaf switch and records them per level of the FT network. The pseudocode then consolidates the collected set of indices per level. If collisions are found, i.e., if different index values are allocated to the parents of a given switch in a certain level, the pseudocode selects the lowest index value among the different index values. Upon finding any different or missing assignment to switches of a certain level, the pseudocode reassigns the indices to a single (e.g., smallest or new) value.

Figures 8, 9:
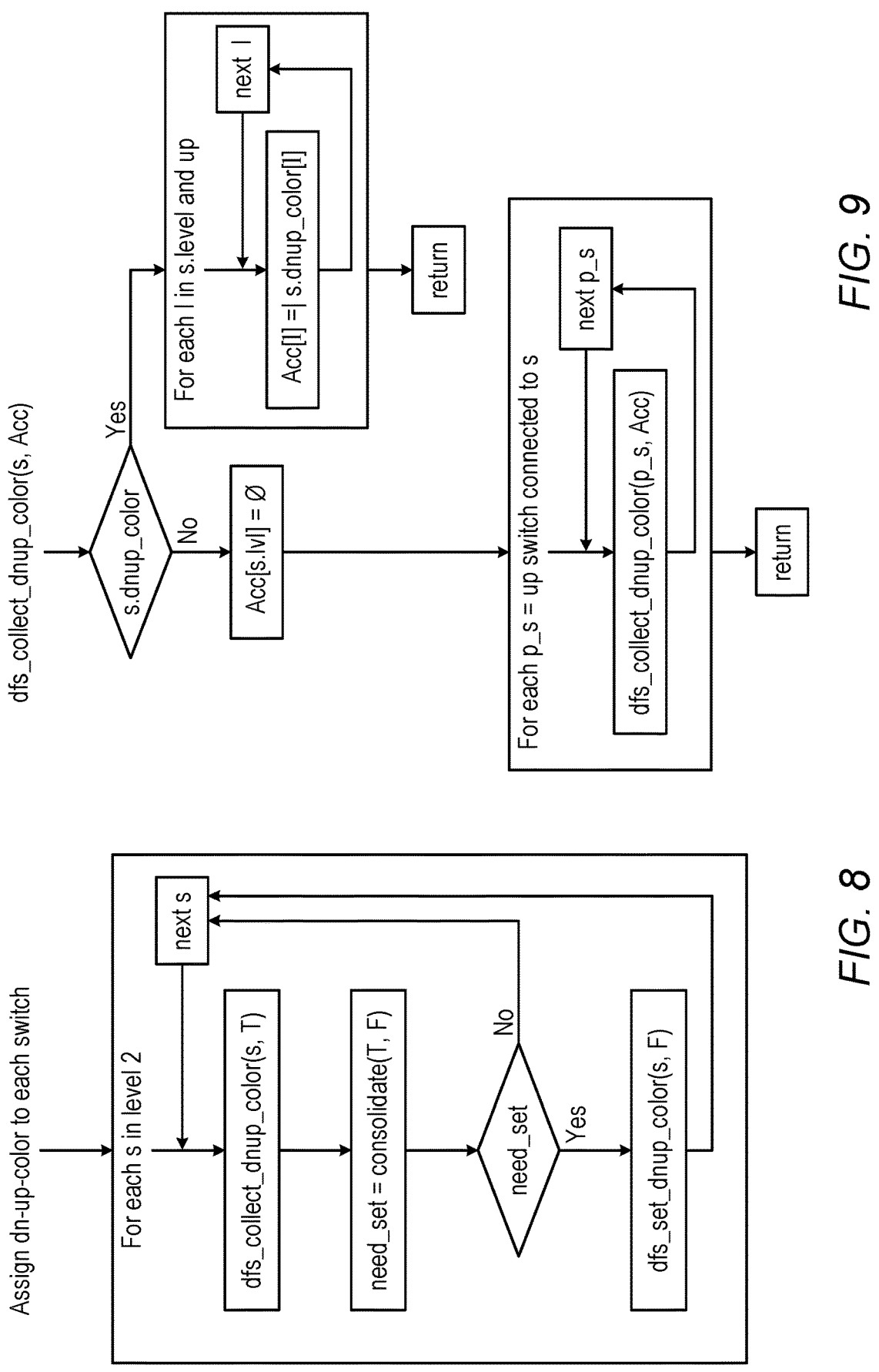
FIGS. 8-11 are diagrams showing example pseudocode
for assigning indices to switches ("coloring"), in accordance
with an embodiment of the present invention.
Figure 10:
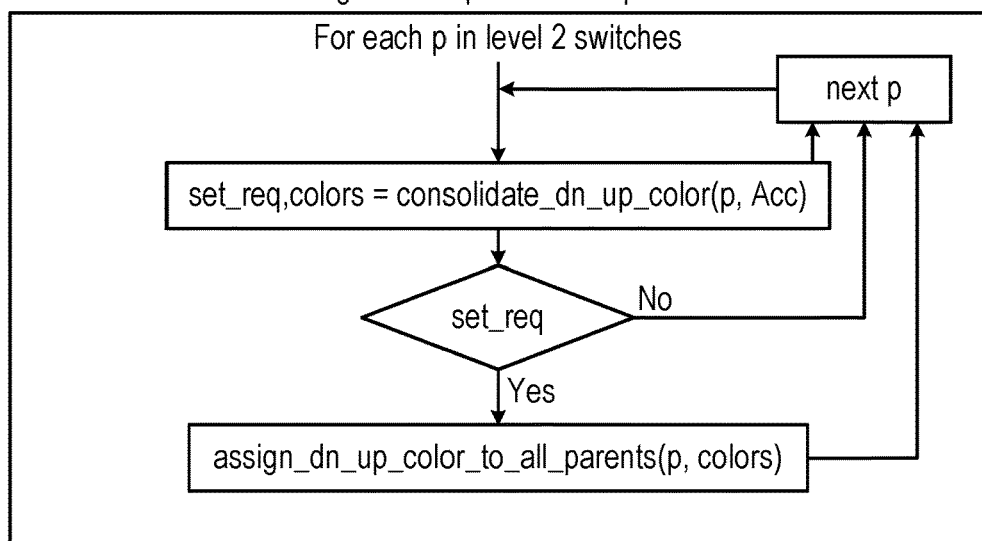
Figure 11:
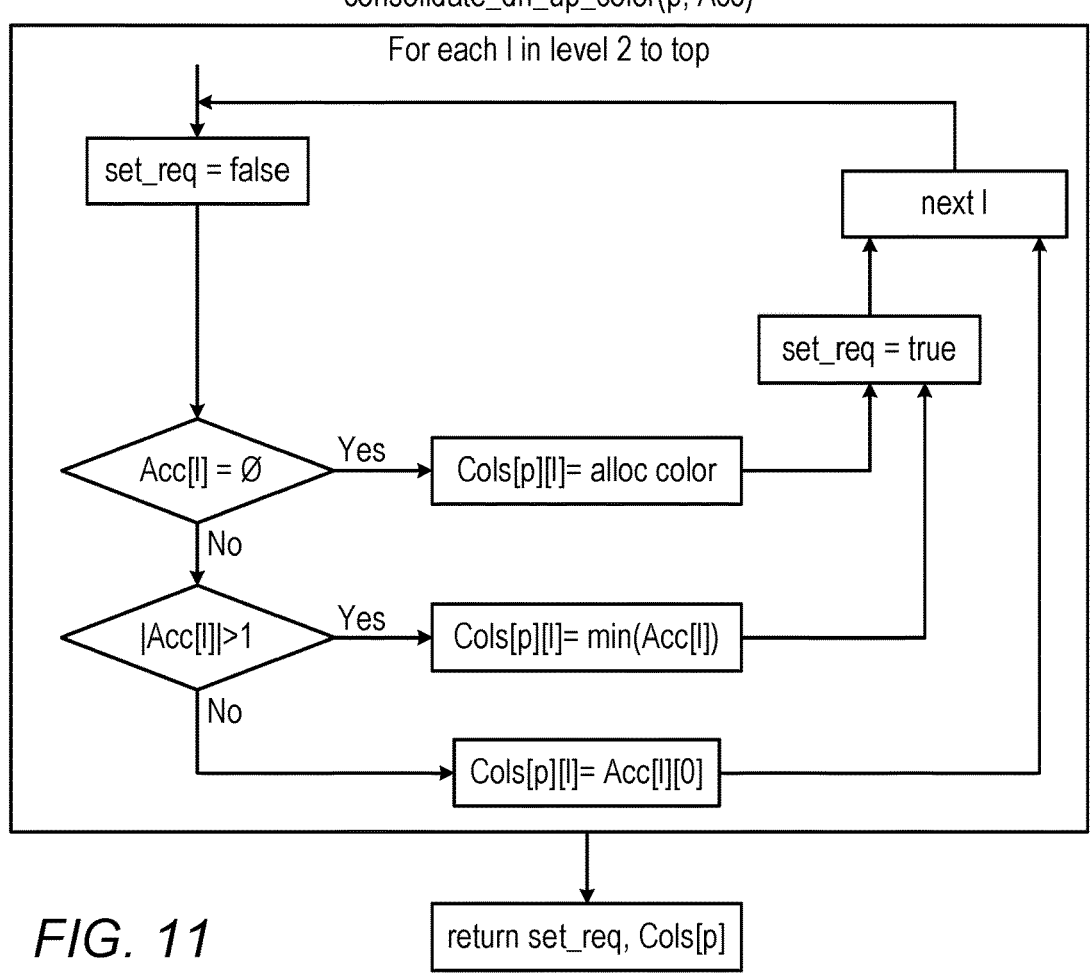

The main routine of the coloring pseudocode is depicted in FIG. 8. FIG. 9 shows a DFS routine for collecting the pre-assigned color indices for each level—The DFS accumulates the assigned colors for each visited switch from the given switch s and up into a data structure denoted "Acc", which holds the set of colors assigned per level. The operator "Acc[l]=l" represents joining of the obtained colors into the accumulated set of colors at level 1. FIG. 10 shows a routine that consolidates the obtained pre-existing parent colors, allocates dn-up color if required, and determines whether setting (or resetting) the color is required. The routine returns the resulting single color required for each level of parents of the leaf switches, as well as an indication of whether color setting is needed. FIG. 11 shows the consolidation process.

Figures 12, 13:
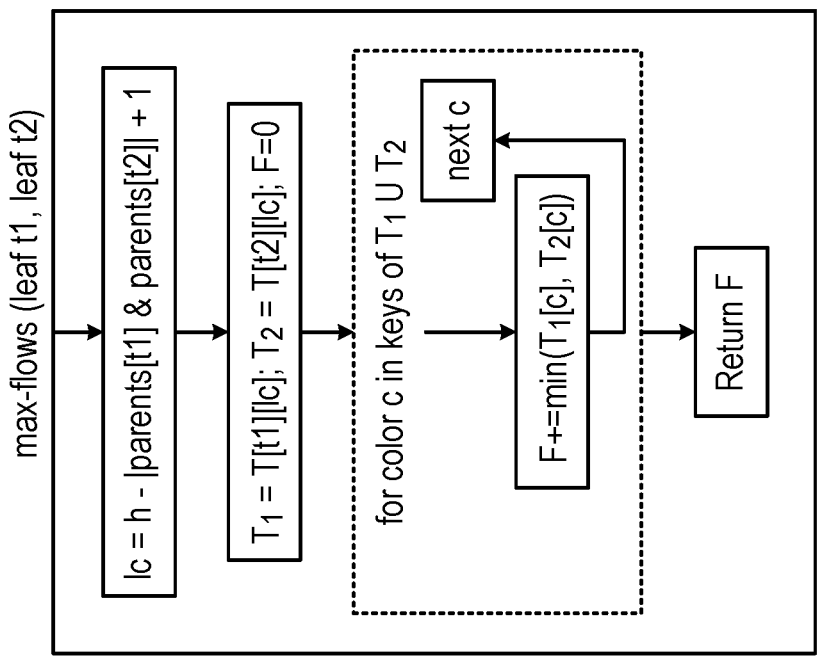
FIG. 12 is a diagram showing example pseudocode for
counting the number of paths between a pair of leaf
switches, in accordance with an embodiment of the present
invention.
FIG. 13 is a diagram showing example pseudocode for
calculating the maximal available bandwidth between a pair
of leaf switches, in accordance with an embodiment of the
present invention.

FIG. 12 is a diagram showing example pseudocode for counting the number of paths between a pair of leaf switches, in accordance with an embodiment of the present invention. The pseudocode of FIG. 12 computes the number of leaf-switch ports connected to each of the dn-up color values. The pseudocode loops over all ports of the leaf switch and creates a per-layer dictionary "T" (also referred to as a map) of color values and their count.

FIG. 13 is a diagram showing example pseudocode for calculating the maximal available bandwidth between a pair of leaf switches, in accordance with an embodiment of the present invention. The pseudocode computes the number of paths ("flows") between a pair of leaf switches denoted t1 and t2. The pseudocode first uses "parents[t1]" and "parents [t2]" to obtain the common parent layer lc=h−|parents[t1] & parents[t2]|+1. The pseudocode then looks-up the maps that give the number of ports per color ("T1=T[t1][lc]", "T2=T [t2][lc]"). The total number of flows between t1 and t2 is given by the sum of the minimal values per same color in T1 and T2.

Although the embodiments described herein mainly address max flow calculation for all pairs of Leaf switches in a Fat Tree, the methods and systems described herein can also be used in other applications, such as in Load Balancing in Routing of Fat Trees.

It will thus be appreciated that the embodiments described above are cited by way of example, and that the present invention is not t limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for bandwidth estimation, the system comprising:

an interface, to communicate with a fat-tree (FT) network comprising:

a plurality of switches comprising (i) multiple leaf switches belonging to a bottom level, (ii) multiple spine switches belonging to a top level and (iii) multiple intermediate switches belonging to one or more intermediate levels between the top level and the bottom level; and multiple links connecting between selected ones of the switches; and a processor, to:

receive via the interface, from the FT network, topology information indicative of a current topology of the FT network;

based on the topology information, estimate one or more available bandwidths between respective pairs of the leaf switches, including estimating an available bandwidth between first and second leaf switches among the multiple leaf switches by:

from among a plurality of bottom-to-top sub-trees of the FT network each extending from a leaf switch among the multiple leaf switches to the top level, identifying a first bottom-to-top sub-tree to which the first leaf switch belongs, and a second bottom-to-top sub-tree to which the second leaf switch belongs;

determining path counts for at least some of the intermediate switches in the one or more intermediate levels, wherein a path count, among the multiple path counts, for a switch is indicative of a number of paths that each (i) passes via the switch, (ii) reaches the first leaf switch via the first bottom-to-top sub-tree and (iii) reaches the second leaf switch via the second bottom-to-top sub-tree; and estimating the available bandwidth between the first and second leaf switches based on the path counts; and perform at least one of the following responsively to the estimated available bandwidths:

(i) assign processing tasks to hosts served by the FT network;

(ii) prioritize maintenance operations on the FT network; and (iii) filter or assign severities to alerts from the FT network.

2. The system according to claim 1, wherein the processor is to identify a lowest common level, defined as a lowest intermediate level among the one or more intermediate levels that comprises a joint parent switch of the first and second leaf switches, and to determine the path counts for the intermediate switches in the lowest common level.

3. The system according to claim 2, wherein the processor is to:

assign indices to the switches in the FT network by scanning the leaf switches in sequence and, for each leaf switch among the leaf switches in the sequence, traverse the bottom-to-top sub-tree to which the leaf switch belongs from the leaf switch toward the top level, and assign an index to each traversed switch that is not yet assigned any index, the index being unique to the leaf switch at least within the level to which the switch belongs;

define (i) a first set comprising the indices assigned to parents of the first leaf switch in the lowest common level, and (ii) a second set comprising the indices assigned to parents of the second leaf switch in the lowest common level; and for each intermediate switch in the lowest common level, determine the path count based on an intersection between the first set of indices and the second set of indices.

4. The system according to claim 3, wherein, after completing the sequence, the processor is to identify a switch that is not assigned any index, and to assign the identified switch a consolidated index.

5. The system according to claim 1, wherein the processor is to determine a total path count between the first leaf switch and the second leaf switch, by:

identifying a set of switches in a given level that are common parents of the first leaf switch and the second leaf switch;

for each common parent in the set, finding a minimum value between (i) a first number of ports connecting the common parent to the first leaf switch and (ii) a second number of ports connecting the common parent to the second leaf switch; and summing the minimal values over the set of the common parents.

6. The system according to claim 1, wherein the topology information is indicative of failures in one or more of the links.

7. The system according to claim 6, wherein, in estimating the available bandwidth, the processor is to account only for failures occurring in links connecting the leaf switches to the intermediate switches in an intermediate level that is immediately above the bottom level.

8. A method for bandwidth estimation, the method comprising:

receiving topology information indicative of a current topology of a fat-tree (FT) network, the FT network comprising a plurality of switches comprising (i) multiple leaf switches belonging to a bottom level, (ii) multiple spine switches belonging to a top level and (iii) multiple intermediate switches belonging to one or more intermediate levels between the top level and the bottom level, and multiple links connecting between selected ones of the switches;

based on the topology information, estimating one or more available bandwidths between respective pairs of the leaf switches, including estimating an available bandwidth between first and second leaf switches among the multiple leaf switches, by:

from among a plurality of bottom-to-top sub-trees of the FT network each extending from a leaf switch among the multiple leaf switches to the top level, identifying a first bottom-to-top sub-tree to which the first leaf switch belongs, and a second bottom-to-top sub-tree to which the second leaf switch belongs;

determining path counts for at least some of the intermediate switches in the one or more intermediate levels, wherein a path count, among the multiple path counts, for a switch is indicative of a number of paths that each (i) passes via the switch, (ii) reaches the first leaf switch via the first bottom-to-top sub-tree and (iii) reaches the second leaf switch via the second bottom-to-top sub-tree; and estimating the available bandwidth between the first and second leaf switches based on the path counts; and performing at least one of the following responsively to the estimated available bandwidths:

(i) assign processing tasks to hosts served by the FT network;

(ii) prioritize maintenance operations on the FT network; and (iii) filter or assign severities to alerts from the FT network.

9. The method according to claim 8, wherein determining the path counts comprises identifying a lowest common level, defined as a lowest intermediate level among the one or more intermediate levels that comprises a joint parent switch of the first and second leaf switches, and determining the path counts for the intermediate switches in the lowest common level.

10. The method according to claim 9, wherein determining the path counts comprises:

assigning indices to the switches in the FT network by scanning the leaf switches in sequence and, for each leaf switch among the leaf switches in the sequence, traversing the bottom-to-top sub-tree to which the leaf switch belongs from the leaf switch toward the top level, and assigning an index to each traversed switch that is not yet assigned any index, the index being unique to the leaf switch at least within the level to which the switch belongs;

defining (i) a first set comprising the indices assigned to parents of the first leaf switch in the lowest common level, and (ii) a second set comprising the indices assigned to parents of the second leaf switch in the lowest common level; and for each intermediate switch in the lowest common level, determining the path count based on an intersection between the first set of indices and the second set of indices.

11. The method according to claim 10, further comprising, after completing the sequence, identifying a switch that is not assigned any index, and assigning the identified switch a consolidated index.

12. The method according to claim 8, wherein determining the path counts comprises determining a total path count between the first leaf switch and the second leaf switch, by:

identifying a set of switches in a given level that are common parents of the first leaf switch and the second leaf switch;

for each common parent in the set, finding a minimum value between (i) a first number of ports connecting the common parent to the first leaf switch and (ii) a second number of ports connecting the common parent to the second leaf switch; and summing the minimal values over the set of the common parents.

13. The method according to claim 8, wherein the topology information is indicative of failures in one or more of the links.

14. The method according to claim 13, wherein estimating the available bandwidth comprises accounting only for failures occurring in links connecting the leaf switches to the intermediate switches in an intermediate level that is immediately above the bottom level.

15. A computer software product, the product comprising a tangible non-transitory computer-readable medium in which program instructions are stored, which instructions, when read by a processor, cause the processor to:

receive topology information indicative of a current topology of a fat-tree (FT) network, the FT network comprising a plurality of switches comprising (i) multiple leaf switches belonging to a bottom level, (ii) multiple spine switches belonging to a top level and (iii) multiple intermediate switches belonging to one or more intermediate levels between the top level and the bottom level, and multiple links connecting between selected ones of the switches;

based on the topology information, estimate one or more available bandwidths between respective pairs of the leaf switches, including estimating an available bandwidth between first and second leaf switches among the multiple leaf switches, by:

from among a plurality of bottom-to-top sub-trees of the FT network each extending from a leaf switch among the multiple leaf switches to the top level, identifying a first bottom-to-top sub-tree to which the first leaf switch belongs, and a second bottom-to-top sub-tree to which the second leaf switch belongs;

determining path counts for at least some of the intermediate switches in the intermediate levels, wherein a path count, among the multiple path counts, for a switch is indicative of a number of paths that each (i) passes via the switch, (ii) reaches the first leaf switch via the first bottom-to-top sub-tree and (iii) reaches the second leaf switch via the second bottom-to-top sub-tree; and estimating the available bandwidth between the first and second leaf switches based on the path counts; and perform at least one of the following responsively to the estimated available bandwidths:

(i) assign processing tasks to hosts served by the FT network;

(ii) prioritize maintenance operations on the FT network; and (iii) filter or assign severities to alerts from the FT network.

16. The product according to claim 15, wherein the instructions cause the processor to identify a lowest common level, defined as a lowest intermediate level among the one or more intermediate levels that comprises a joint parent switch of the first and second leaf switches, and to determine the path counts for the intermediate switches in the lowest common level.

17. The product according to claim 16, wherein the instructions cause the processor to:

assign indices to the switches in the FT network by scanning the leaf switches in sequence and, for each leaf switch among the leaf switches in the sequence, traverse the bottom-to-top sub-tree to which the leaf switch belongs from the leaf switch toward the top level, and assign an index to each traversed switch that is not yet assigned any index, the index being unique to the leaf switch at least within the level to which the switch belongs;

define (i) a first set comprising the indices assigned to parents of the first leaf switch in the lowest common level, and (ii) a second set comprising the indices assigned to parents of the second leaf switch in the lowest common level; and for each switch in the lowest common level, determine the path count based on an intersection between the first set of indices and the second set of indices.

18. The product according to claim 17, wherein the instructions cause the processor to, after completing the sequence, identify a switch that is not assigned any index, and assign the identified switch a consolidated index.

19. The product according to claim 15, wherein the instructions cause the processor to determine a total path count between the first leaf switch and the second leaf switch, by:

identifying a set of switches in a given level that are common parents of the first leaf switch and the second leaf switch;

for each common parent in the set, finding a minimum value between (i) a first number of ports connecting the common parent to the first leaf switch and (ii) a second number of ports connecting the common parent to the second leaf switch; and summing the minimal values over the set of the common parents.

20. The product according to claim 15, wherein the topology information is indicative of failures in one or more of the links.

\* \* \* \* \*